(12) United States Patent  
Nakamura et al.

(10) Patent No.: US 8,436,605 B2  
(45) Date of Patent: May 7, 2013

(54) TELEVISION APPARATUS AND ELECTRONIC DEVICE

(75) Inventors: Toshikatsu Nakamura, Akishima (JP); Kohei Wada, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 82 days.

(21) Appl. No.: 13/084,461

(22) Filed: Apr. 11, 2011

(65) Prior Publication Data

US 2011/0285385 A1   Nov. 24, 2011

(30) Foreign Application Priority Data

May 21, 2010   (JP) .................. 2010-117195

(51) Int. Cl.  
*G01B 7/14*   (2006.01)

(52) U.S. Cl.  
USPC .................................................. 324/207.11

(58) Field of Classification Search .............. 324/207.11  
See application file for complete search history.

(56) References Cited

U.S. PATENT DOCUMENTS

| | | | |
|---|---|---|---|
| 5,113,296 A | 5/1992 | Kaneko | |
| 5,144,505 A | 9/1992 | Kaneko | |
| 7,405,504 B2 | 7/2008 | Arimitsu | |

FOREIGN PATENT DOCUMENTS

| | | |
|---|---|---|
| JP | HEI03-017856 | 2/1991 |
| JP | HEI06-230678 | 8/1994 |
| JP | HEI11-355986 | 12/1999 |
| JP | 2000-286121 | 10/2000 |
| JP | 2004-177327 | 6/2004 |
| JP | 2007-024689 | 2/2007 |
| JP | 2007-074130 | 3/2007 |

OTHER PUBLICATIONS

Notice of Rejection mailed by the Japan Patent Office on Aug. 16, 2011 in corresponding Japanese patent app. No. 2010-117195 in 5 pages.

Decision of a Patent Grant mailed by the Japan Patent Office on Nov. 8, 2011 in corresponding Japanese patent app. No. 2010-117195 in 3 pages.

*Primary Examiner* — Reena Aurora  
(74) *Attorney, Agent, or Firm* — Knobbe Martens Olson & Bear LLP

(57) ABSTRACT

According to one embodiment, a television apparatus includes a first component and a second component, a cylindrical or columnar magnet, a magnetic sensor, and an engagement mechanism. The first component and the second component are connected to be relatively rotatable. The magnet is provided to the first component, and a plurality of magnetic poles are formed along the outer circumference of the magnet. The magnetic sensor is provided to the second component to detect magnetism of the magnetic poles. The engagement mechanism includes at least one convex-concave engagement portion configured to allow the magnet and the first component to be mutually engaged inside or on the outer circumference of the magnet. The engagement mechanism is asymmetric with respect to the central axis of the magnet and asymmetric with respect to any virtual plane including the central axis.

13 Claims, 15 Drawing Sheets

FIG.14A     FIG.14B     FIG.14C
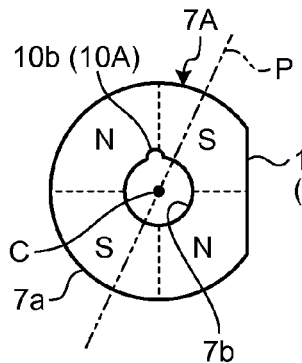 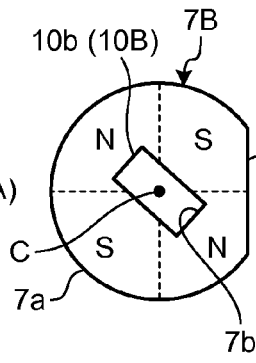 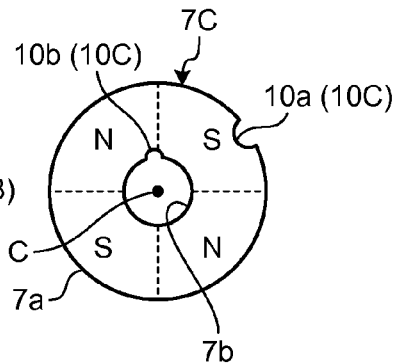
FIG.14D     FIG.14E     FIG.14F
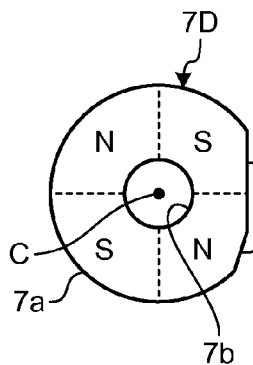 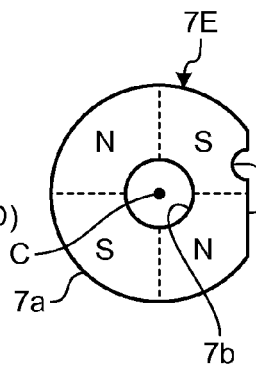 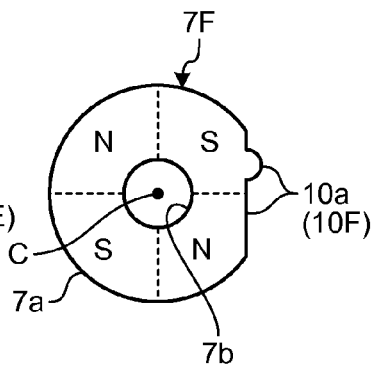
FIG.14G     FIG.14H
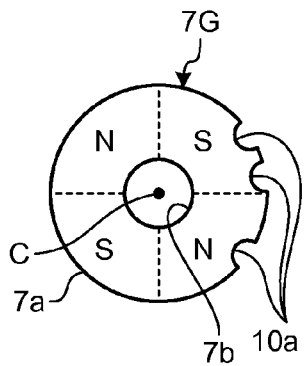 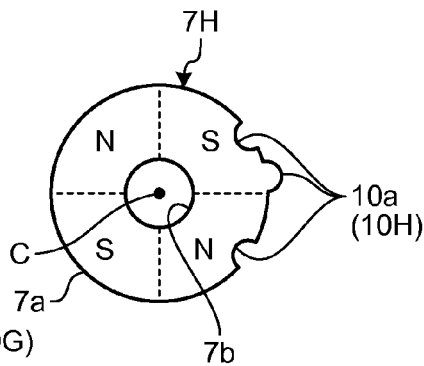

TELEVISION APPARATUS AND ELECTRONIC DEVICE

CROSS-REFERENCE TO RELATED APPLICATIONS

This application is based upon and claims the benefit of priority from Japanese Patent Application No. 2010-117195, filed May 21, 2010, the entire contents of which are incorporated herein by reference.

FIELD

Embodiments described herein relate generally to a television apparatus and an electronic device.

BACKGROUND

There have been known a television apparatus provided with a sensor that detects the angle of the main body having a display panel with respect to the stand (see, for example, Patent Application Publication (KOKAI) No. 2007-074130).

This type of electronic devices are required to be provided with a angle detection mechanism with a simple structure that is less likely to cause trouble.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIGS. 14A to 14H are exemplary side views (viewed in the direction of the central axis of the magnet) of a magnet of a PC as an electronic device according to modifications of the embodiments.

DETAILED DESCRIPTION

Figure 1:
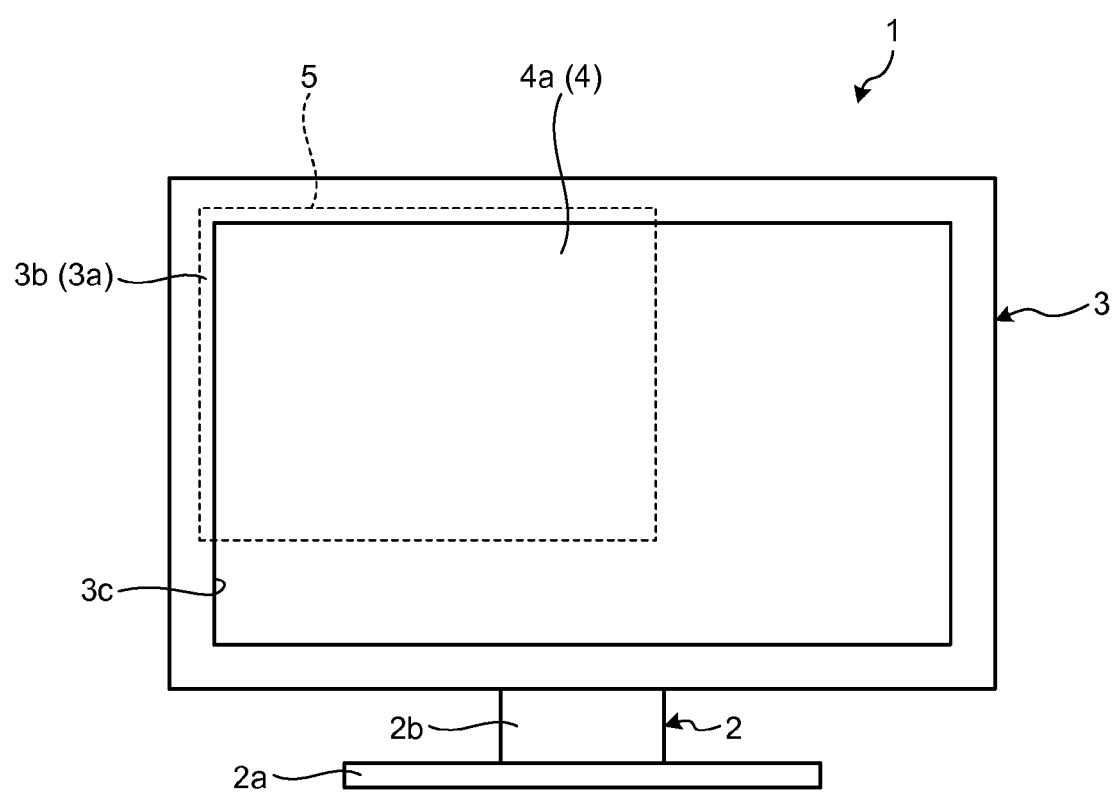
FIG. 1 is an exemplary front view of a television apparatus as an electronic device according to a first embodiment.

Various embodiments will be described hereinafter with reference to the accompanying drawings. In general, according to one embodiment, a television apparatus comprises a first component and a second component, a cylindrical or columnar magnet, a magnetic sensor, and an engagement mechanism. The first component and the second component are connected to be relatively rotatable. The magnet is provided to the first component, and a plurality of magnetic poles are formed along the outer circumference of the magnet. The magnetic sensor is provided to the second component, and is configured to detect magnetism of the magnetic poles. The engagement mechanism comprises at least one convex-concave engagement portion configured to allow the magnet and the first component to be mutually engaged inside or on the outer circumference of the magnet. The engagement mechanism is configured to be asymmetric with respect to the central axis of the magnet and asymmetric with respect to any virtual plane including the central axis.

According to another embodiment, an electronic device comprises a first component and a second component, a cylindrical or columnar magnet, a magnetic sensor, and an engagement mechanism. The first component and the second component are connected to be relatively rotatable. The magnet is provided to the first component, and a plurality of magnetic poles are formed along the outer circumference of the magnet. The magnetic sensor is provided to the second component, and is configured to detect magnetism of the magnetic poles. The engagement mechanism comprises at least one convex-concave engagement portion configured to allow the magnet and the first component to be mutually engaged inside or on the outer circumference of the magnet. The engagement mechanism is configured to be asymmetric with respect to the central axis of the magnet and asymmetric with respect to any virtual plane including the central axis.

According to still another embodiment, an electronic device comprises a first component and a second component, a cylindrical or columnar magnet, a magnetic sensor, and an engagement mechanism. The first component and the second component are connected to be relatively rotatable. The magnet is provided to the first component, and a plurality of magnetic poles are formed along the outer circumference of the magnet. The magnetic sensor is provided to the second component, and is configured to detect magnetism of the magnetic poles. The engagement mechanism comprises a convex-concave engagement portion configured to allow the magnet and the first component to be mutually engaged inside or on the outer circumference of the magnet. The magnetic poles are configured to be symmetric with respect to one virtual plane passing through the central axis of the magnet. The engagement mechanism is configured to be symmetric with respect to the virtual plane.

According to still another embodiment, an electronic device comprises a magnetic element, a first component, a second component, and a sensor. The magnetic element comprises a plurality of magnetic poles, a first positioning portion, and a second positioning portion located in a different position from the first positioning portion. The first component comprises a housing configured to house the magnetic element. The second component is rotatably connected to the first component. The sensor is provided to the second component, and is configured to detect magnetism of the magnetic poles.

In the following, like reference numerals refer to like features of the embodiments, and the same description will not be repeated.

As illustrated in FIG. 1, a television apparatus 1 as an electronic device according to a first embodiment comprises a stand 2 and a main body 3 supported by the stand 2.

The main body 3 has a rectangular appearance in a front view (a plan view of the front surface). The main body 3 comprises a housing 3a, a display panel 4 as a display device, and a circuit board 5. The display panel 4 may be, for example, a liquid crystal display (LCD) panel, and has a display screen 4a which is exposed from an opening 3c formed in a front surface 3b of the housing 3a. The circuit board 5 has an electronic component and the like (not illustrated) mounted thereon. The display panel 4 and the circuit board 5 are fixed to the housing 3a with a screw (not illustrated) or the like.

The display panel 4 is formed into a flat rectangular parallelepiped shape in the front-back direction (the direction perpendicular to the plane of FIG. 1). The display panel 4 receives a video signal from a video signal processing circuit in a control circuit comprising an electronic component or the like (all not illustrated) mounted on the circuit board 5, thereby displaying video including a still image and a moving image on the display screen 4a on the front side. The control circuit of the television apparatus 1 comprises, in addition to the video signal processing circuit, a tuner, a high-definition multimedia interface (HDMI) signal processor, an audio/video (AV) input terminal, a remote control signal receiver, a controller, a selector, an on-screen display interface, a storage module such as a read only memory (ROM), a random access memory (RAM), and a hard disk drive (HDD), and an audio signal processing circuit (all not illustrated). The circuit board 5 is housed behind the display panel 4 in the housing 3a. An angle detection mechanism, which will be described later, and part of a control circuit or the like for angle detection may be mounted on the circuit board 5. The television apparatus 1 further comprises a built-in amplifier, speaker, and the like (all not illustrated) for outputting audio.

Figure 2:
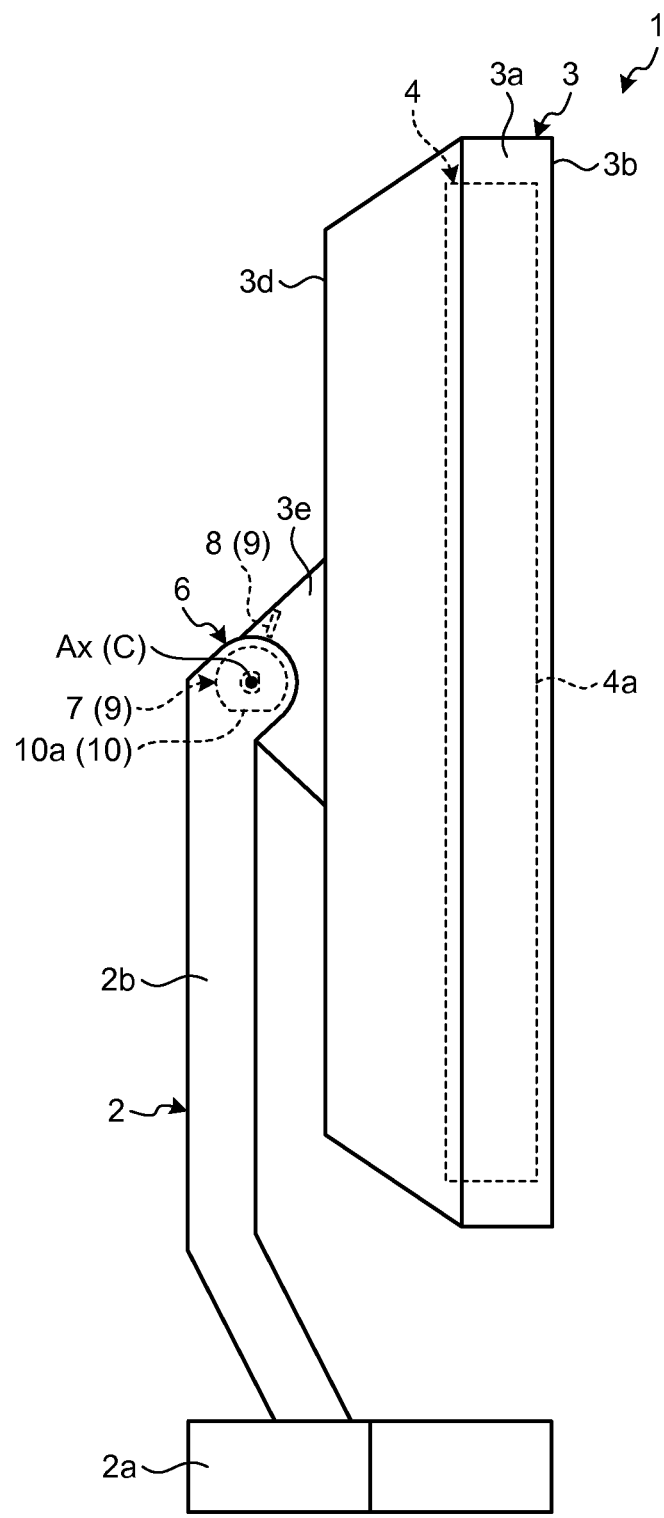
FIG. 2 is an exemplary side view of the television apparatus as an electronic device in the first embodiment.

As illustrated in FIG. 2, the main body 3 is supported by the stand 2 via a hinge mechanism 6 to be relatively rotatable about a rotation axis Ax extending along the horizontal direction. In the first embodiment, the stand 2 and the main body 3 correspond to two components connected to be relatively rotatable. The stand 2 corresponds to a first component, while the main body 3 corresponds to a second component.

The stand 2 comprises a base 2a and a leg 2b. The leg 2b extends upward from the base 2a to the back of the center of the main body 3. An end of the leg 2b and the center of a back wall 3d of the main body 3 are connected via the hinge mechanism 6 to be relatively rotatable. In the first embodiment, with the structure including the hinge mechanism 6, the angel (tilt angle, elevation angle, depression angle, etc.) of the display screen 4a of the display panel 4 can be appropriately adjusted. For example, the hinge mechanism 6 may comprise a shaft (not illustrated) that is provided to the stand 2 and an arm 3e that is provided to the housing 3a of the main body 3 and is rotatably supported by the shaft. With the frictional resistance between part of the stand 2 and part of the main body 3, the main body 3 can be held at a predetermined angle with respect to the stand 2.

Figure 3A:
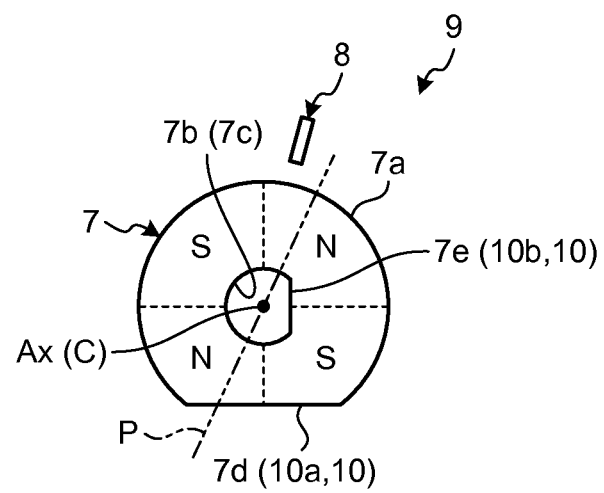
FIG. 3A is an exemplary side view schematically illustrating the positional relationship between a magnet and a magnetic sensor in the television apparatus as an electronic device in the state where a main body stands in the first embodiment.
Figure 3B:
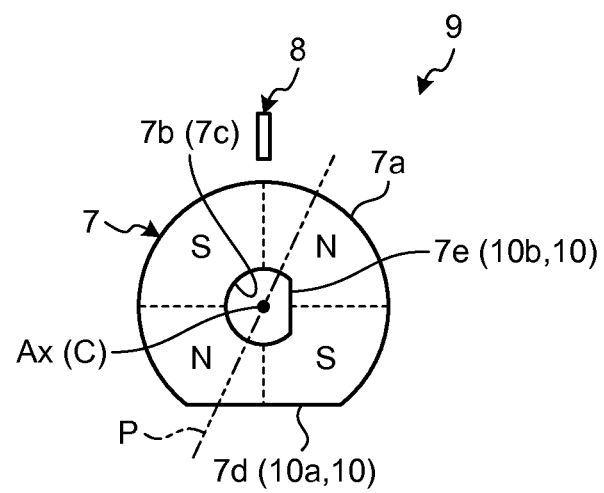
FIG. 3B is an exemplary side view schematically illustrating the positional relationship between the magnet and the magnetic sensor in the television apparatus as an electronic device in the state where the main body is tilted backward with respect to a stand in the first embodiment.

The angle of the main body 3 with respect to the stand 2 can be detected by an angle detection mechanism 9 comprising a magnet 7 as a magnetized magnetic element and a magnetic sensor 8 that detects magnetism. As illustrated in FIGS. 3A and 3B, the magnet 7 is formed in a cylindrical or columnar shape (a doughnut-like shape) provided with a through hole 7b. The magnet 7 is polarized along an outer circumference surface 7a, and a plurality of (four in the first embodiment) magnetic poles (north (N) and south (S)) are formed. The magnet 7 is housed in a container (not illustrated) in the housing of the stand 2, and is located adjacent to the shaft (not illustrated) in the axial direction. A central axis C of the magnet 7 matches the rotation axis Ax. On the other hand, the magnetic sensor 8 is housed in the housing of the stand 2, and is located to face the outer circumference surface 7a of the magnet 7 with a space therebetween. With this structure, if the main body 3 rotates with respect to the stand 2, as illustrated in FIGS. 3A and 3B, the position of the magnet 7 with respect to the magnetic sensor 8 changes. As a result, magnetism detected by the magnetic sensor 8 changes. For example, the magnetic sensor 8 can detect a change from the state where the magnetic sensor 8 faces a north (N) pole portion in the outer circumference surface 7a of the magnet 7 as illustrated in FIG. 3A to the state where it faces a south (S) pole portion in the outer circumference surface 7a of the magnet 7 as illustrated in FIG. 3B. The magnetic sensor 8 may comprise, for example, a giant magnetoresistive (GMR) element, an anisotropic magnetoresistive (AMR) element, a hall element, or the like.

As in the first embodiment, if the magnet 7 is formed in a cylindrical or columnar shape, the magnet 7, the structure provided to the stand 2 to hold the magnet 7, the structure to allow the magnetic sensor 8 to rotate relative to the magnet 7, and the like can be relatively simplified. Moreover, it is easier to adjust the level of magnetism detected by the magnetic sensor 8. On the other hand, if the magnet 7 is simply in a cylindrical or columnar shape, the magnet 7 may be erroneously assembled. For this reason, in the first embodiment, an engagement mechanism 10 is provided. The engagement mechanism 10 comprises convex-concave engagement portions 10a and 10b to allow the magnet 7 and the stand 2 to be mutually engaged. The engagement mechanism 10 prevents the magnet 7 to be erroneously assembled to the stand 2.

As illustrated in FIG. 3, the engagement mechanism 10 comprising a plurality of (two in the first embodiment) the convex-concave engagement portions 10a and 10b (the shape is illustrated only on the magnet 7 side) is asymmetric as a whole with respect to the central axis C of the magnet 7 and is asymmetric with respect to any virtual plane P including the central axis C (FIG. 3 illustrates only an example represented by a straight line). Accordingly, by setting the magnet 7 to be engaged with the stand 2 through the engagement mechanism 10, it is possible to prevent the deviation of the rotation of the magnet 7 about the central axis C and the reversal (front-back inversion) of the magnet 7. Thus, the magnet 7 is arranged in a predetermined posture with respect to the stand 2, and a desired arrangement of the magnetic poles can be achieved. Although not illustrated, the stand 2 is provided with a portion in contact with the outer or inner circumference surface 7a or 7c of the magnet 7 at the convex-concave engagement portions 10a and 10b (i.e., part of the convex-concave engagement portions 10a and 10b on the stand 2 side) and a portion holding the magnet 7 other than the convex-concave engagement portions 10a and 10b.

In the first embodiment, structural part of the convex-concave engagement portions 10a and 10b is formed as plane surfaces 7d and 7e in parallel with the central axis C (see FIG. 3). Accordingly, the convex-concave engagement portions 10a and 10b can be relatively easily formed.

Both the convex-concave engagement portions 10a and 10b function as a stopper to regulate the rotation of the magnet 7 about the central axis C with respect to the stand 2. If either only one of the convex-concave engagement portions 10a and 10b is provided, the magnet 7 can be attached to the stand 2 even in a reversed (front-back inverted) posture. If the magnet 7 is attached reversed to the stand 2, the magnetic poles may be shifted from or opposite their desired location. In the first embodiment, in the position where the two the convex-concave engagement portions 10a and 10b are provided, the angle difference about the central axis C is set to an angle other than 0° and 18° (90° in the first embodiment). Therefore, the magnet 7 cannot be attached to the stand 2 in a reversed posture. In the first embodiment, the two plane surfaces 7d and 7e provided to the magnet 7 correspond to first and second positioning portions that form the convex-concave engagement portions 10a and 10b. With the two positioning portions provided to different positions of the magnet 7, the magnet 7 is held by the stand 2 in a predetermined posture.

The engagement mechanism 10 comprises the convex-concave engagement portions 10a and 10b. The convex-concave engagement portion 10a allows the stand 2 and the magnet 7 to engage each other at part of the periphery (the outer circumference surface 7a) of the magnet 7. The convex-concave engagement portion 10b allows the stand 2 and the magnet 7 to engage each other inside the magnet 7 (part of the inner circumference surface 7c of the through hole 7b). In the first embodiment, the convex-concave engagement portion 10a corresponds to a first convex-concave engagement portion, while the convex-concave engagement portion 10b corresponds to a second convex-concave engagement portion. If both the convex-concave engagement portions 10a and 10b are provided to the periphery of the magnet 7, it is difficult to ensure a large angular range of the magnetic sensor 8 with respect to the outer circumference surface of the columnar magnet 7. If both the convex-concave engagement portions 10a and 10b are provided inside the magnet 7, it is difficult to form each of them in a large size. As a result, the positioning accuracy of the magnet 7 is difficult to be increased. In the first embodiment, such inconvenience is not likely to arise since the convex-concave engagement portions 10a and 10b are provided to the periphery and the inside of the magnet 7, respectively.

According to the first embodiment, as illustrated in FIG. 2, among the main body 3 and the stand 2 as two components connected to be relatively rotatable, the main body 3 as a component provided with the magnetic sensor 8 comprises the display panel 4. The stand 2 as a component provided with the magnet 7 does not comprise the display panel 4. That is, the magnet 7 is not provided to the main body 3 having the display panel 4. Accordingly, the magnet 7 is located distant from the display panel 4, which facilitates to suppress the effect of magnetism of the magnet 7 on the display panel 4.

According to the first embodiment, the convex-concave engagement portion 10a provided to the periphery of the magnet 7 is located opposite the magnetic sensor 8 with respect to the central axis C. This facilitates to ensure a large angular range of the magnetic sensor 8 with respect to the outer circumference surface of the columnar magnet 7. Thus, the detection accuracy of the magnetic sensor 8 can be easily improved compared to the case where the magnetic sensor 8 faces the convex-concave shape of the magnet 7.

According to the first embodiment, the rotation axis Ax matches the central axis C. Thus, it is possible to prevent the variation of the distance between the magnet 7 and the magnetic sensor 8 depending on the relative angle of the two components. Accordingly, the angular range where the detection of the angle detection mechanism 9 is possible can be easily increased. The angle detection mechanism 9 is required to detect the relative angle position of at least one of the two components. The angle detection mechanism 9 may be configured to detect two or more relative angle positions.

From the angle detection result obtained by the angle detection mechanism 9, the controller of the television apparatus 1 can perform predetermined control. More specifically, for example, when the angle detection mechanism 9 detects a predetermined angle, the controller of the television apparatus 1 may turn on or off the power, display a predetermined image (a moving image, a still image, tickers, etc.) on the display screen 4a, or output predetermined sound from the speaker.

If the main body 3 is connected to the stand 2 to be relatively rotatable about the vertical rotation axis in the horizontal direction, the angle in the horizontal direction (pan angle) can be detected by the same angle detection mechanism. The controller of the television apparatus 1 may perform control according to the detected pan angle. The angle detection mechanism may be provided for each of the tilt angle and the pan angle.

Figure 4:
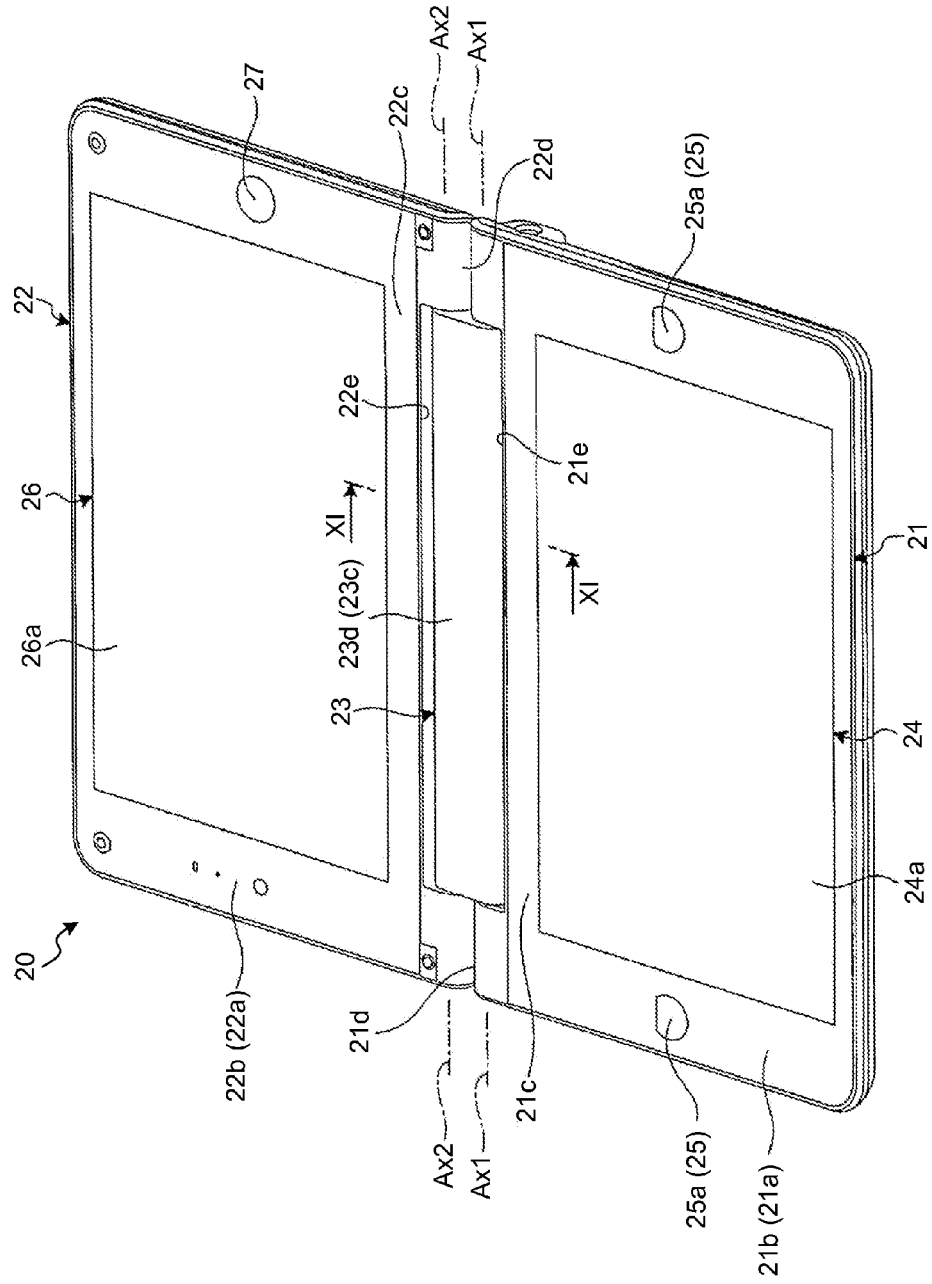
FIG. 4 is an exemplary perspective view of a personal computer (PC) as an electronic device viewed from the front according to a second embodiment.

A description will be given of an electronic device according to a second embodiment. As illustrated in FIG. 4, the electronic device of the second embodiment is, for example, a notebook personal computer (PC) 20. The PC 20 comprises a flat rectangular first body 21 and a flat rectangular second body 22. The first body 21 and the second body 22 are connected via a joint 23 to be relatively rotatable.

The first body 21 is provided with a display panel 24 as a display device, a press button mechanism 25, and the like, which are exposed on a front surface 21b as the outer surface of a housing 21a. The display panel 24 may be, for example, a liquid crystal display (LCD) panel provided with a touch panel 24a on the front surface 21b side. On the other hand, the second body 22 is provided with a display panel 26 as a display device (a component), a pointing device 27, and the like, which are exposed on a front surface 22b as the outer surface of a housing 22a. The display panel 26 may be, for example, a liquid crystal display (LCD) panel provided with a touch panel 26a on the front surface 22b side. When the PC 20 is in the open position as illustrated in FIG. 4, the display panels 24 and 26, a cover 25a of the press button mechanism 25, the pointing device 27, and the like are exposed to allow the user to use them. On the other hand, in the closed position, the front surface 21b closely faces the front surface 22b, and the display panels 24 and 26, the cover 25a, the pointing device 27, and the like are covered between the housings 21a and 22a. In the second embodiment, the touch panels 24a and 26a, the press button mechanism 25, the press button mechanism 25, the pointing device 27, and a microphone (not illustrated) correspond to an input devices. The display panels 24 and 26, a speaker (not illustrated), and the like correspond to an output devices. In the case of a PC provided with a keyboard and a click button, the keyboard and the click button are also input devices. In the second embodiment, for example, the housing 22a of the second body 22 houses therein a control circuit board (not illustrated) mounted with at least part of a control circuit including an electronic component.

Figure 5:
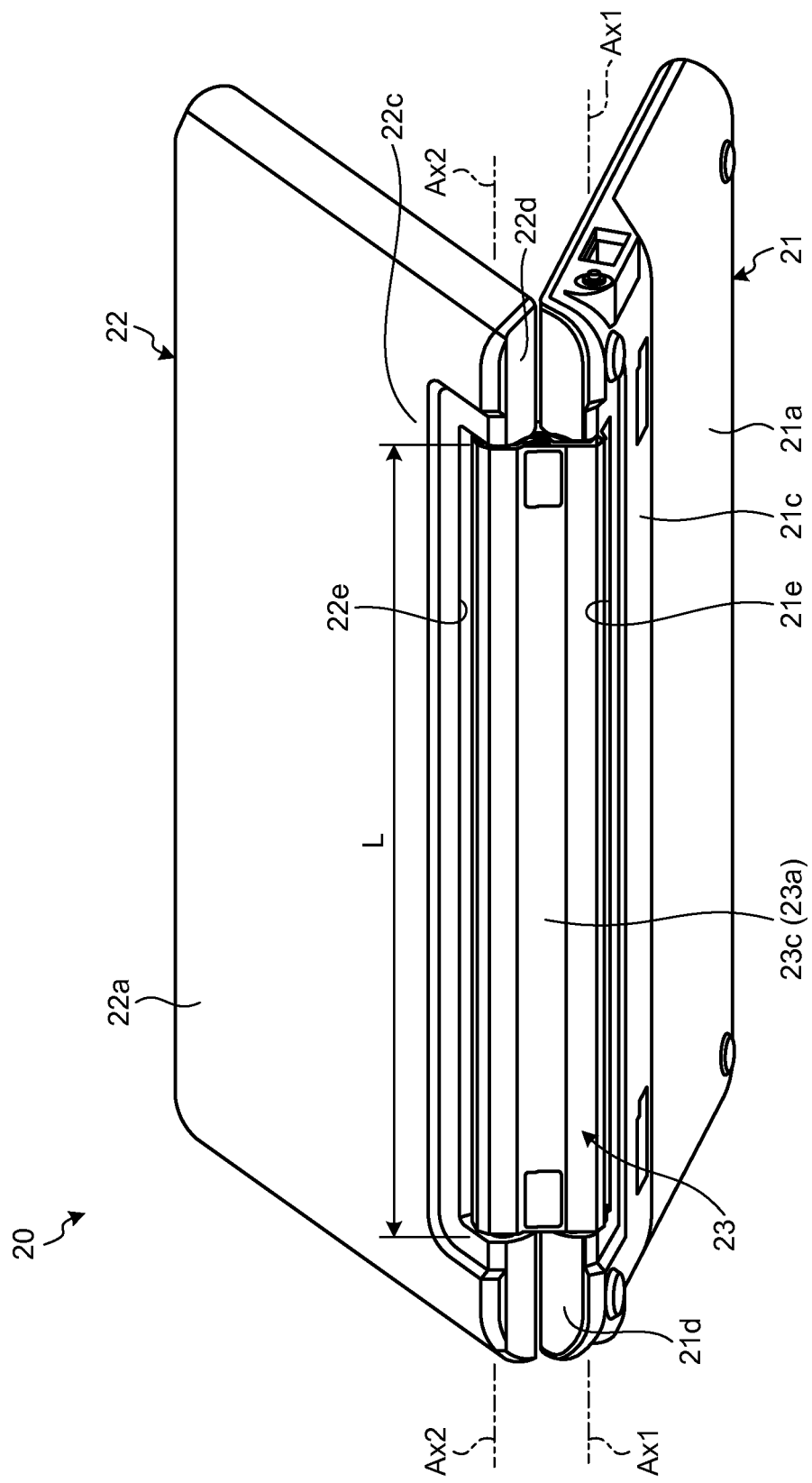
FIG. 5 is an exemplary perspective view of the PC as an electronic device viewed from the back in the second embodiment.
Figure 13:
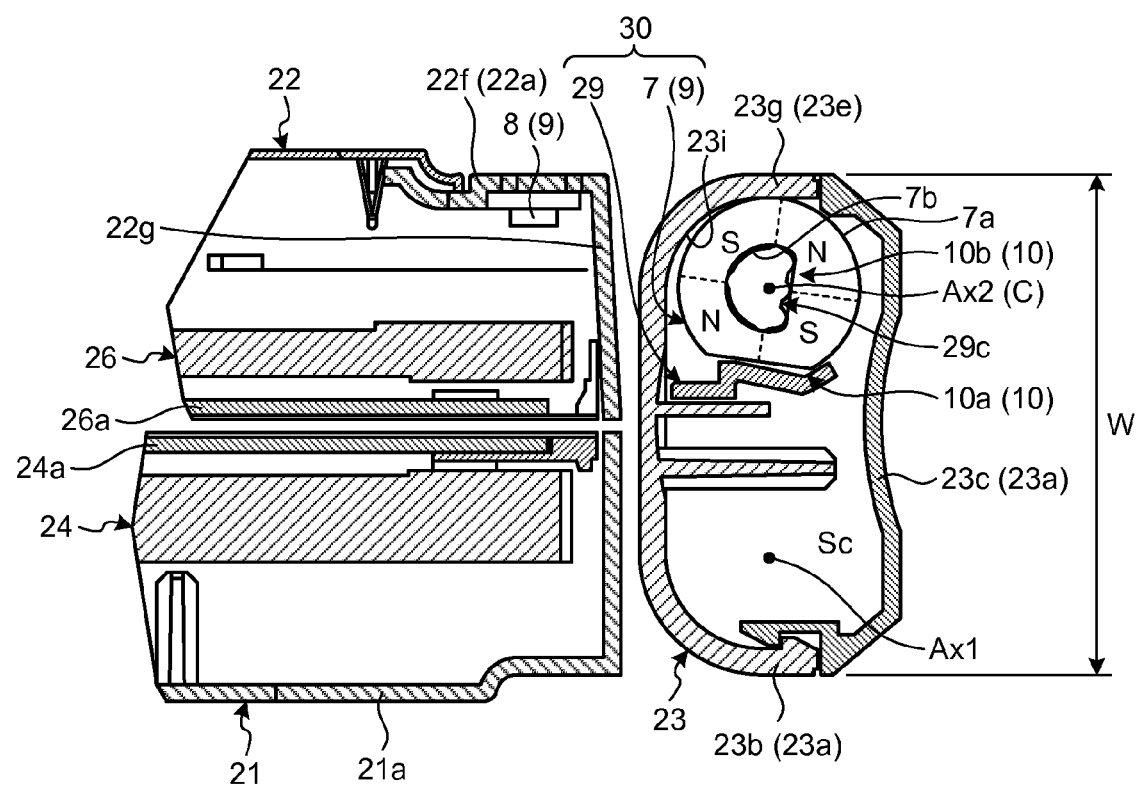
FIG. 13 is an exemplary cross-sectional view taken along line XI-XI of FIG. 4 in the closed position in the second embodiment.

As illustrated in FIG. 5, in the second embodiment, the joint 23 is a component that connects the first body 21 and the second body 22, and the first body 21 and the second body 22 are formed as different components. The joint 23 connects an end portion 21c of the first body 21 located on the base side and an end portion 22c of the second body 22. Cutout portions 21e and 22e are formed in the longitudinal center of edges 21d and 22d of the end portions 21c and 22c, respectively such that both ends in the longitudinal directions are left. The cutout portions 21e and 22e are formed rectangular with a long opening width and a short depth. A half of the joint 23 is inserted to the cutout portion 21e, while the other half is inserted to the cutout portion 22e. The length L of the joint 23 is a little shorter than the width of the cutout portions 21e and 22e. As illustrated in FIG. 13, the width W of the joint 23 is almost the same as the total thickness of the first body 21 and the second body 22 closed one on top of the other.

Figure 6:
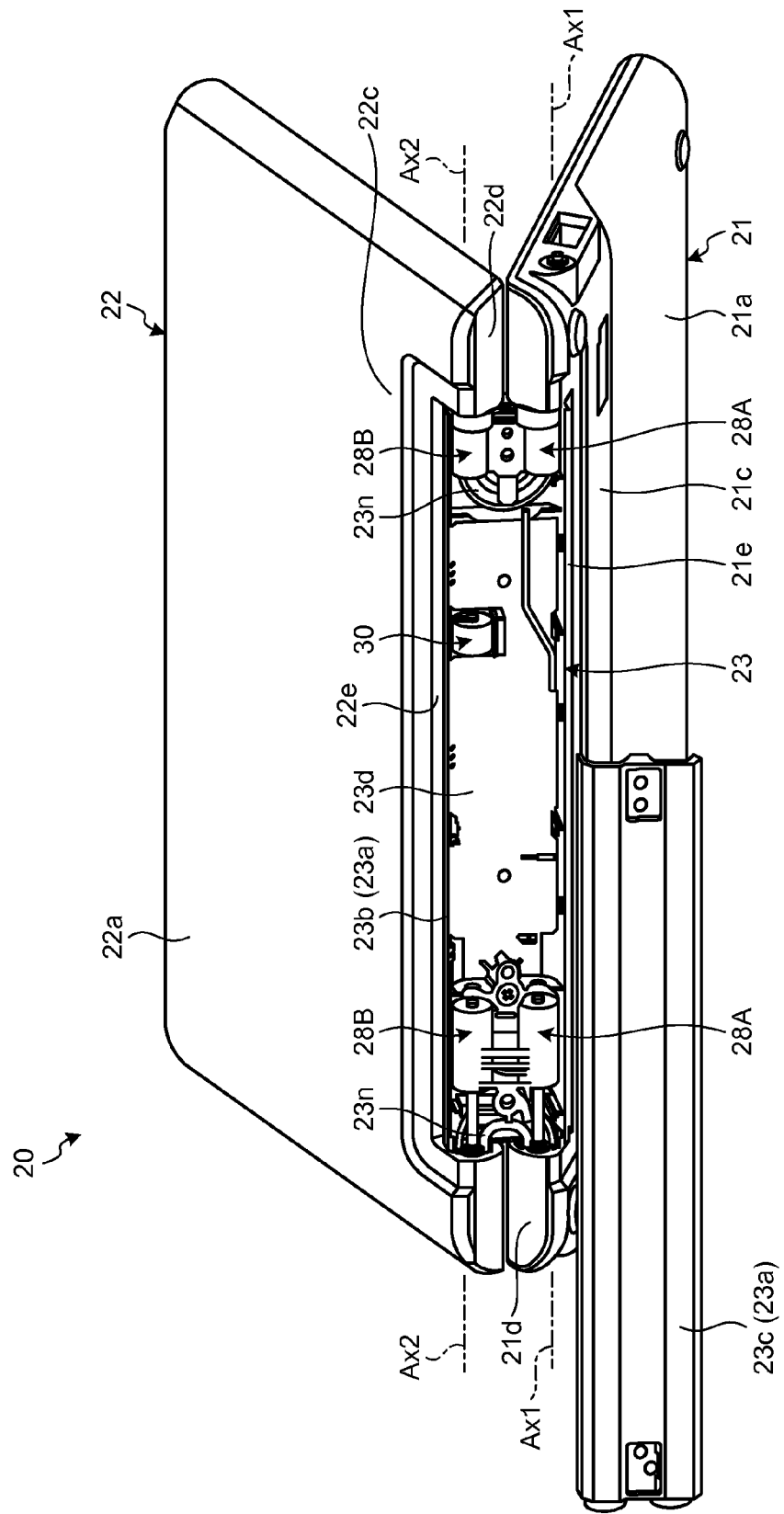
FIG. 6 is an exemplary view of the PC illustrated in FIG. 5 where a cover is removed from the joint in the second embodiment.

As illustrated in FIG. 6, the first body 21 and the joint 23 are connected to be rotatable about a rotation axis Ax1 via a first hinge mechanism 28A. Meanwhile, the second body 22 and the joint 23 are connected to be rotatable about a rotation axis Ax2 via a second hinge mechanism 28B. The rotation axes Ax1 and Ax2 are in parallel to each other. In the second embodiment, the first hinge mechanism 28A and the second hinge mechanism 28B work together. The relative rotation angle of the first body 21 about the rotation axis Ax1 with respect to the joint 23 is the same as that of the second body 22 about the rotation axis Ax2 with respect to the joint 23. The first body 21 and the second body 22 relatively rotates with respect to the joint 23 in opposite directions. When the user brings the first body 21 or the second body 22 to the open position with respect to the joint 23, the PC 20 is placed into the open position. On the other hand, when the user brings the first body 21 or the second body 22 to the closed position with respect to the joint 23, the PC 20 is placed into the closed position. When the user brings the first body 21 and the second body 22 to the open position, the PC 20 is placed into the open position. Similarly, when the user brings the first body 21 and the second body 22 to the closed position, the PC 20 is placed into the closed position.

Figure 11:
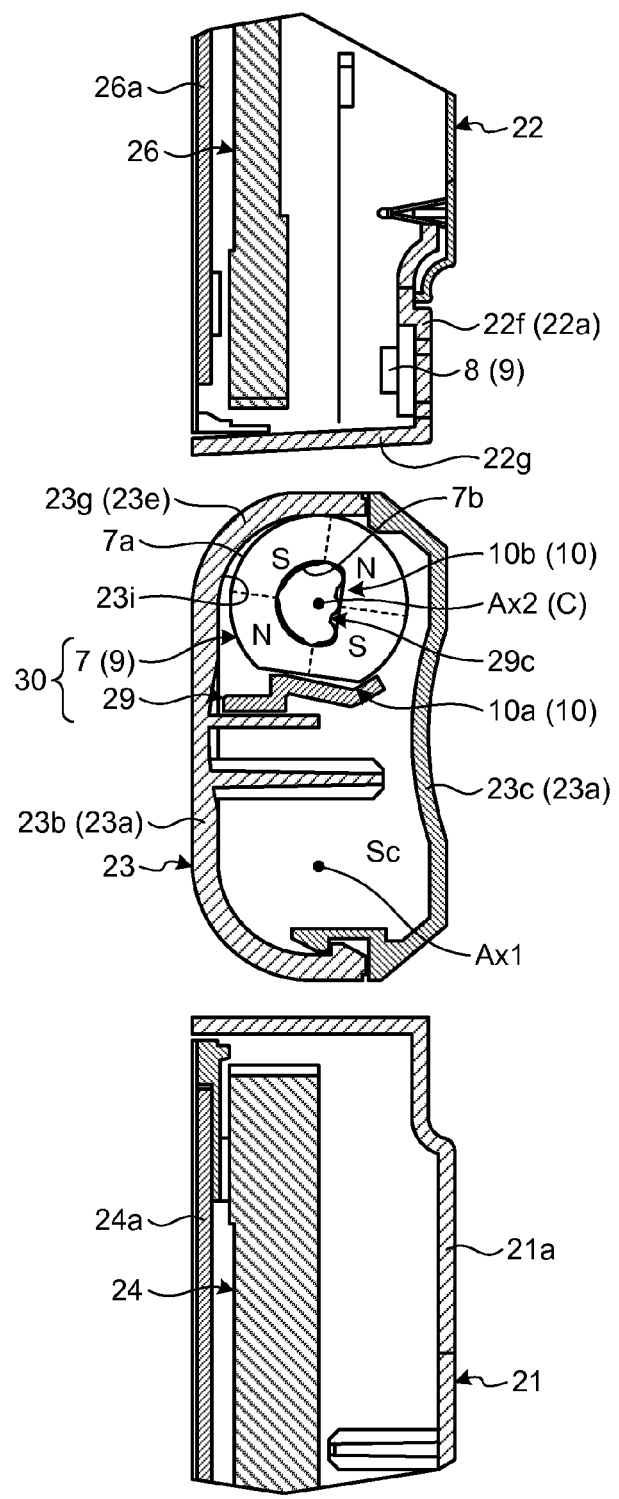
FIG. 11 is an exemplary cross-sectional view taken along line XI-XI of FIG. 4 in the second embodiment.

As illustrated in FIG. 11, a housing 23a of the joint 23 comprises a combination of a base 23b on the front side and a cover 23c on the back side. An inner space Sc is formed between the base 23b and the cover 23c. The hinge mechanisms 28A and 28B, a circuit board 23d (see FIG. 6), a magnet unit 30, and the like are housed in the inner space Sc. The magnet unit 30 comprises the magnet 7 of the angle detection mechanism 9. As illustrated in FIG. 6, a harness 23n is routed in the housing 23a of the joint 23. The harness 23n connects an electric component in the housing 21a of the first body 21 and an electric component in the housing 22a of the second body 22.

Figure 7:
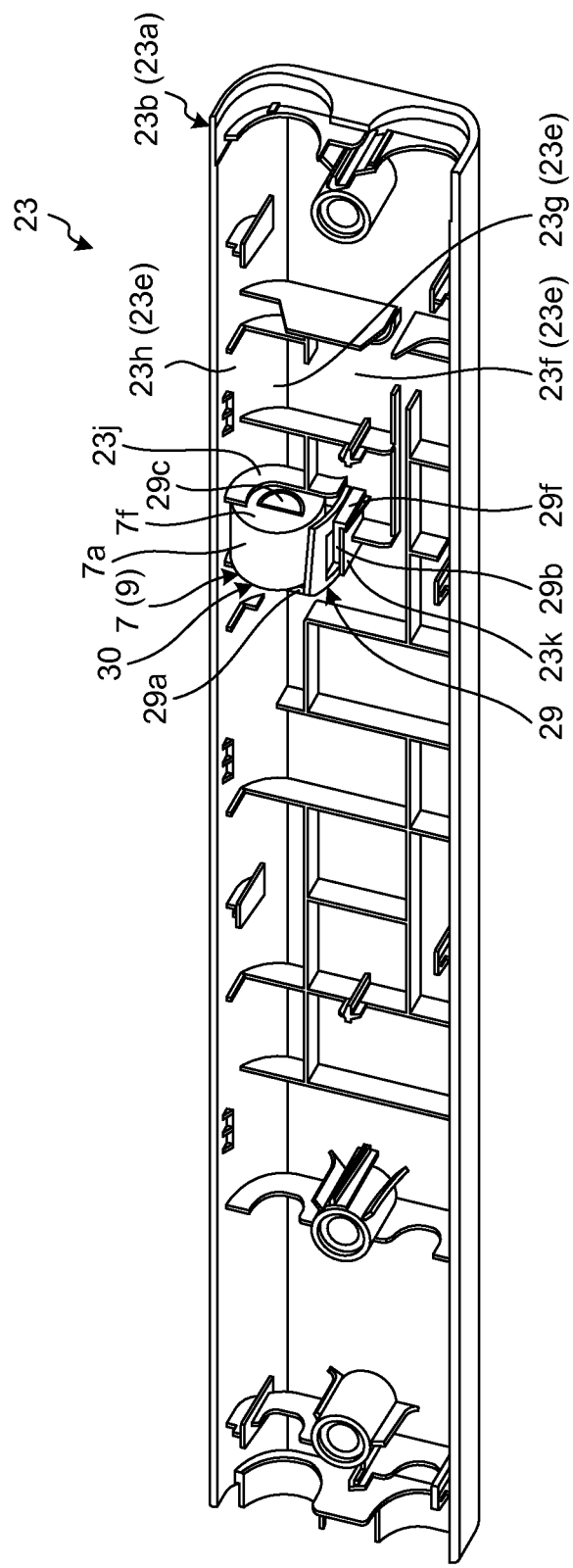
FIG. 7 is an exemplary perspective view of part of the inside of the joint of the PC as an electronic device in the second embodiment.
Figure 8:
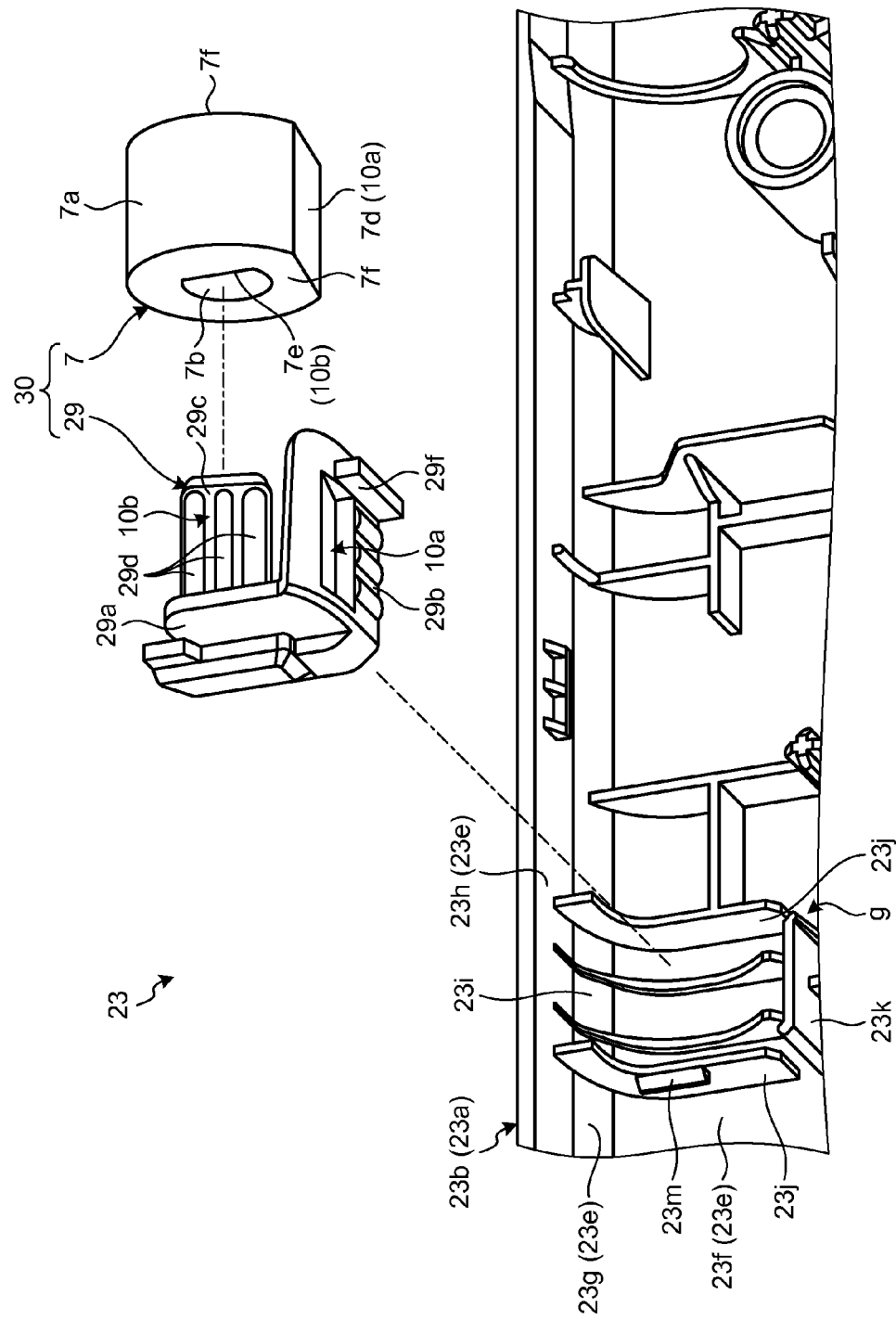
FIG. 8 is an exemplary exploded perspective view of a housing, a magnet, and a holder of the joint of the PC as an electronic device in the second embodiment.

As illustrated in FIGS. 7 and 8, in the second embodiment, the magnet 7 and a holder 29 constitutes the magnet unit 30. The holder 29 of the magnet unit 30 is attached to the base 23b of the joint 23. In other words, the magnet 7 is attached to the base 23b of the joint 23 via the holder 29. With this, the structure of the joint 23 can be simplified compared to the structure in which the magnet 7 is directly attached to the joint 23, and also attachment work can be easily performed.

Figure 9A:
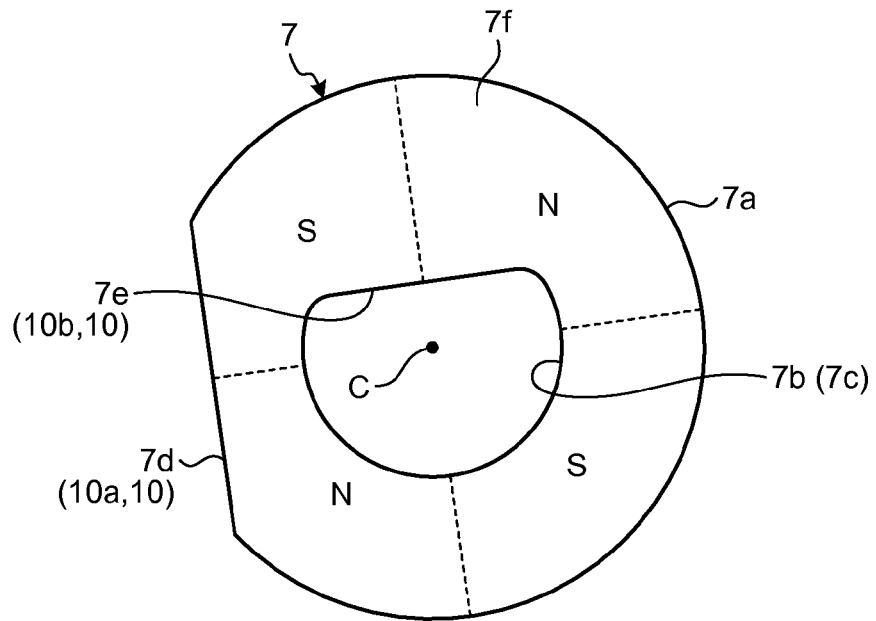
FIG. 9A is an exemplary side view (viewed in the direction of the central axis of the magnet) of the magnet of a magnet unit attached to the PC as an electronic device in the second embodiment.
Figure 9B:
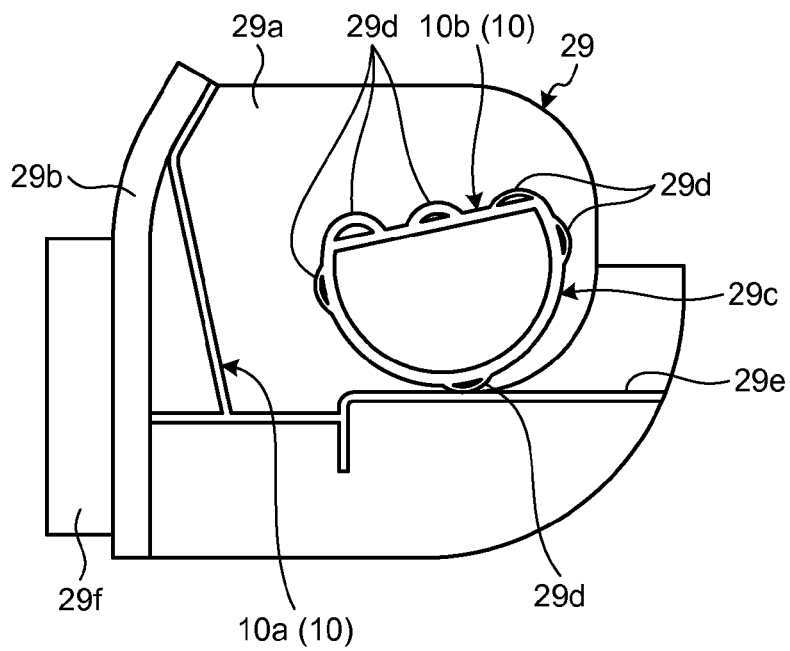
FIG. 9B is an exemplary side view (viewed in the direction of the central axis of the magnet) of the holder of the magnet unit attached to the PC as an electronic device in the second embodiment.
Figure 10:
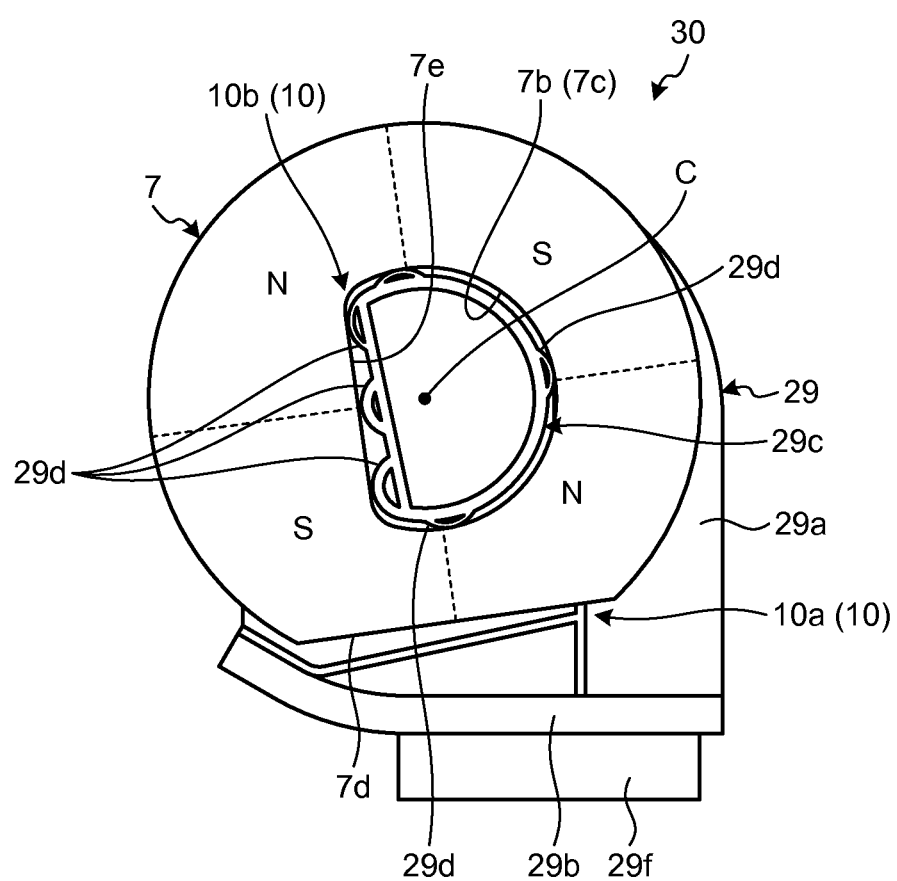
FIG. 10 is an exemplary side view (viewed in the direction of the central axis of the magnet) of the magnet unit attached to the PC as an electronic device in the second embodiment.

As illustrated in FIGS. 8 to 10, and the like, the magnet 7 has the same structure as previously described in the first embodiment. That is, the magnet 7 is formed in a cylindrical or columnar shape (a doughnut-like shape) provided with the through hole 7b in the center. The plane surface 7d that constitutes the convex-concave engagement portion 10a is formed on the periphery of the magnet 7. The plane surface 7e that constitutes the convex-concave engagement portion 10b is formed in the through hole 7b of the magnet 7. As illustrated in FIGS. 9A, 9B, and 10, as in the first embodiment, the magnet 7 is polarized along the outer circumference surface 7a, and a plurality of (four in the second embodiment) magnetic poles (N and S) are formed. In the second embodiment, the plane surface 7d corresponds to the first positioning portion (or the second positioning portion), while the plane surface 7e corresponds to the second positioning portion (or the first positioning portion).

As illustrated in FIG. 8, the holder 29 comprises an end wall 29a and a side wall 29b connected in an L-shape, and a shaft 29c extending from the end wall 29a in parallel to the side wall 29b. The shaft 29c is inserted into the through hole 7b of the magnet 7. A protrusion 29d is formed on s surface of the shaft 29c. As illustrated in FIG. 10, when the shaft 29c is inserted into the through hole 7b of the magnet 7, the protrusion 29d is pressed by the inner circumference surface 7c of the through hole 7b and collapsed by plastic deformation. That is, by pressing the shaft 29c of the holder 29 into the through hole 7b of the magnet 7, the magnet 7 is attached to the holder 29.

The holder 29 is fitted to the base 23b of the joint 23. As illustrated in FIGS. 7 and 8. The base 23b comprises an outer wall 23e having a U-shaped cross-section. A pair of ribs 23j are provided on an inner circumference surface 23i from a bottom wall 23f of the outer wall 23e through a bent portion 23g to a side wall 23h. The ribs 23j is located on both sides of ends 7f of the magnet 7. A rib 23k is provided on the bottom wall 23f to be substantially in parallel with the side wall 23h. The magnet unit 30 is located between the ribs 23j in the direction of the central axis C of the magnet 7 and thereby positioned. In the width direction of the base 23b (the direction perpendicular to the central axis C and in parallel to the bottom wall 23f), the magnet unit 30 is located between the side wall 23h and the rib 23k and thereby positioned. The rib 23j is provided with a claw 23m that locks the holder 29. The claw 23m engages with a stepped portion 29e (see FIG. 9) provided to the end wall 29a of the holder 29. The engagement of the claw 23m and the stepped portion 29e prevents the magnet unit 30 from separating from the bottom wall 23f. A claw 29f is provided on the end side of the side wall 29b of the holder 29. The claw 29f is inserted into a gap g (see FIG. 8) between one of the ribs 23j and the rib 23k and engages with them. Thus, the user can relatively easily attach the magnet 7 to the base 23b by attaching the magnet 7 to the holder 29 to form the magnet unit 30 first, and then attaching the magnet unit 30 to the base 23b. In the second embodiment, the bent portion 23g, the ribs 23j and 23k, the claws 23m and 29f, the holder 29, and the like correspond to the housing for the magnet 7.

In the second embodiment, as illustrated in FIGS. 9 and 10, the engagement mechanism 10 is located between the magnet 7 and the holder 29. The engagement mechanism 10 of the second embodiment is of the same structure as that of the first embodiment. That is, the engagement mechanism 10 comprises the convex-concave engagement portions 10a and 10b.

The convex-concave engagement portion 10a allows the holder 29 fixed to the joint 23 and the magnet 7 to engage each other at part of the periphery (the outer circumference surface 7a) of the magnet 7. The convex-concave engagement portion 10b allows the holder 29 fixed to the joint 23 and the magnet 7 to engage each other inside the magnet 7 (part of the inner circumference surface 7c of the through hole 7b). The holder 29 cannot be attached to the joint 23 in a reversed (front-back inverted) posture.

As illustrated in FIG. 11, the magnet 7 constituting the angle detection mechanism 9 is arranged on the joint 23 such that the periphery (the outer circumference surface 7a) of the magnet 7 closely faces or is in contact with the inner circumference surface 23i of the bent portion 23g of the outer wall 23e. The bent portion 23g of the outer wall 23e corresponds to an outer wall that is bent about the rotation axis Ax2. As described above, in the second embodiment, the cylindrical or columnar magnet is arranged along the inner circumference surface 23i of the bent portion 23g. Thus, the magnetism of the magnet 7 can effectively work on the outside of the outer wall 23e of the joint 23 (outside the housing 23a). Besides, the outer circumference surface 7a of the magnet 7 is in contact with the inner circumference surface 23i of the bent portion 23g. With this, the magnet 7 can be more easily positioned with the joint 23.

As illustrated in FIG. 11, the housing 22a of the second body 22 houses the display panel 26, the touch panel 26a, the magnetic sensor 8 constituting the angle detection mechanism 9, and the like. In the second embodiment, the display panel 26 is located near the front side of the housing 22a (the left side in FIG. 11, one side in the thickness direction), while the magnetic sensor 8 is located near the back side of the housing 22a (the right side in FIG. 11, the other side in the thickness direction). This prevents the effect of the display panel 26 on the magnetic sensor 8. The magnetic sensor 8 is located near the end wall 22g facing the joint 23 and the bottom wall 22f of the housing 22a (the back wall of the cutout portion 22e).

Figure 12:
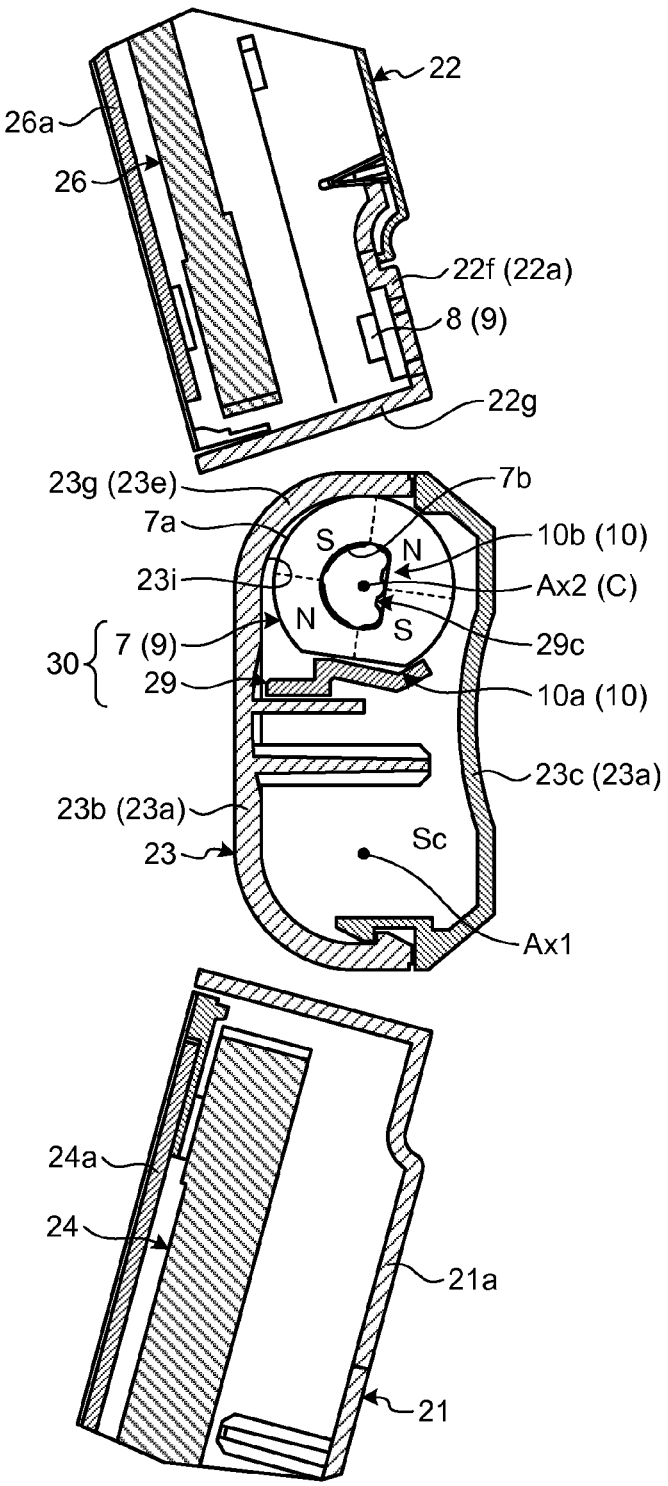
FIG. 12 is an exemplary cross-sectional view taken along line XI-XI of FIG. 4 from an open position to a closed position in the second embodiment.

As illustrated in FIGS. 11 to 13, the first body 21 and the second body 22 rotate at different angles with respect to the joint 23 in opposite directions. In the second embodiment also, the central axis C of the magnet 7 matches the rotation axis Ax2. Accordingly, with the relative rotation of the second body 22 with respect to the joint 23, the magnetic sensor 8 relatively rotates along the circumference having the central axis C of the magnet 7 as the center. The magnetic sensor 8 detects the magnetism of the magnetic poles formed along the outer circumference surface 7a of the magnet 7. In the second embodiment, in the state where the second body 22 is closed by a predetermined angle (for example, about 15°) as illustrated in FIG. 12, the magnetic pole facing the magnetic sensor 8 changes from the north pole to the south pole, and the detection result of the magnetic sensor 8 changes. That is, in the second embodiment, the angle detection mechanism 9 can detect that the second body 22 (second component) and the joint 23 (first component) as two components are at the angle as illustrated in FIG. 12. In the second embodiment also, the angle detection mechanism 9 is required to detect the relative angle position of at least one of the two components. The angle detection mechanism 9 may be configured to detect two or more relative angle positions. From the angle detection result obtained by the angle detection mechanism 9, the controller of the PC 20 can perform predetermined control. More specifically, for example, when the angle detection mechanism 9 detects a predetermined angle, the controller of the PC 20 may turn on or off the power, display a predetermined image (a moving image, a still image, tickers, etc.) on the display screen of the display panel 24 or 26, or output predetermined sound from the speaker.

As described above, in the PC 20 as an electronic device of the second embodiment, the same angle detection mechanism 9 as in the first embodiment is provided between the second body 22 and the joint 23. The same engagement mechanism 10 as in the first embodiment is provided between the magnet 7 of the angle detection mechanism 9 and the joint 23. Thus, the second embodiment can achieve the same effect as the first embodiment.

The PC 20 as an electronic device of the second embodiment comprises the first body 21, the second body 22, and the joint 23. The first body 21 comprises at least one of the input device, the output device, and the control circuit board (not illustrated). The second body 22 comprises at least one of the input device, the output device, and the control circuit board (not illustrated). The joint 23 is connected to both the first body 21 and the second body 22 to be relatively rotatable. The magnet 7 is provided to the joint 23, and the magnetic sensor 8 is provided to at least one of the first body 21 and the second body 22 (only the second body 22 in the second embodiment). That is, the magnet 7 is located on the joint 23, which facilitates to prevent the effect of magnetism of the magnet 7 on the electric component, the electronic component, and the like in the first body 21 and the second body 22 (the second body 22 in the second embodiment). Besides, since the magnetic sensor 8 is provided to the second body 22 that houses the control circuit board, the harness that connects the control circuit board and the magnetic sensor 8 can be relatively short and easily routed.

According to the second embodiment, the display panel 26 is located near one side in the thickness direction of the housing 22a of the second body 22, while the magnetic sensor 8 is located near the other side in the thickness direction of the housing 22a. This prevents the effect of the display panel 26 on the detection result of the magnetic sensor 8.

According to the second embodiment, the joint 23 comprises the bent portion 23g as the outer wall that is bent about the rotation axis Ax2. The magnet 7 is arranged such that the periphery (the outer circumference surface 7a) of the magnet 7 closely faces the inner circumference surface 23i of the bent portion 23g. Thus, the magnetism of the magnet 7 can effectively work on the outside of the outer wall 23e of the joint 23. Besides, the outer circumference surface 7a of the magnet 7 is in contact with the inner circumference surface 23i of the bent portion 23g. With this, the magnet 7 can be more easily positioned with the joint 23.

As in the first embodiment described above, according to the second embodiment, the second body 22 as one of the two components comprises the display panel 26. The joint 23 as the other of the two components does not comprise a display panel. The engagement mechanism 10 comprises the convex-concave engagement portion 10a on the periphery (the outer circumference surface 7a) of the magnet 7. The convex-concave engagement portion 10a is located opposite the magnetic sensor 8 with respect to the central axis C of the magnet 7. The rotation axis Ax2 as the central axis of the relative rotation of the two components matches the central axis C of the magnet 7. Thus, the second embodiment can achieve the same effect as the first embodiment.

FIGS. 14A to 14H illustrate engagement mechanisms according to modifications of the embodiments. In place of the magnet 7, each of magnets 7A to 7H may be installed in the electronic device according to the first or the second embodiment. Engagement mechanisms 10A to 10H of the respective modifications (FIGS. 14A to 14H illustrate only the shapes of the magnets 7A to 7H) each comprises a plurality of (two or more) the convex-concave engagement portions 10a and 10b. The engagement mechanisms 10A to 10H are asymmetric as a whole with respect to the central axes C of the magnets 7A to 7H, respectively, and is asymmetric with respect to any virtual plane P including the central axis C (FIG. 14A illustrates only an example represented by a straight line). FIGS. 14A to 14H illustrate only the shapes of the magnets 7A to 7H, and the first and the second positioning portions are designated by reference numerals 10a and 10b, respectively.

The engagement mechanisms 10A to 10H of the respective modifications illustrated in FIGS. 14A to 14H comprise the convex-concave engagement portions 10a and 10b provided to the periphery (the outer circumference surface 7a) of the magnets 7A to 7H and the inside of the through hole 7b, respectively. The structural part of the magnets 7A to 7H that constitutes the convex-concave engagement portions 10a and 10b (i.e., the first and the second positioning portions) may be a plane, a recess, a groove, a protrusion, or the like.

The engagement mechanisms 10D to 10H of the respective modifications illustrated in FIGS. 14D to 14H comprise a plurality of the convex-concave engagement portions 10a provided to the periphery (the outer circumference surface 7a) of the magnets 7D to 7H. The structural part of the magnets 7D to 7H that constitutes the convex-concave engagement portions 10a (i.e., the first or the second positioning portions) may be a plane, a recess, a groove, a protrusion, or the like. When the convex-concave engagement portions 10a are provided to only the outer circumference surface 7a, as illustrated in FIG. 14D, the convex-concave engagement portions 10a may be located adjacent to each other. Alternatively, as illustrated in FIGS. 14E and 14F, one of the convex-concave engagement portions 10a may be located in the other. Further, as illustrated in FIGS. 14G and 14H, three or more of the convex-concave engagement portions 10a may be provided.

Figure 15:
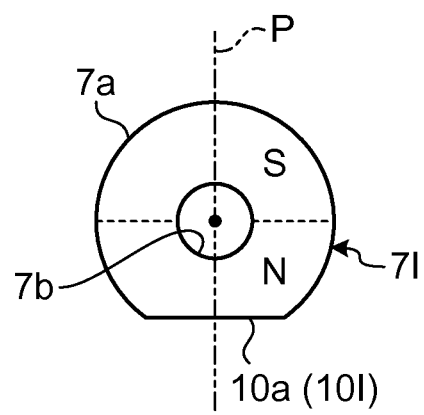
FIG. 15 is an exemplary side view (viewed in the direction of the central axis of the magnet) of a magnet of a PC as an electronic device according to a third embodiment.

FIG. 15 illustrates a magnet 7I provided to an electronic device (not illustrated) according to a third embodiment. The magnet 7I may be installed in the electronic device in place of the magnet 7 and the magnets 7A to 7H of the first embodiment, the second embodiment, and the modifications. In the magnet 7I of the third embodiment, magnetic poles are configured to be symmetric with respect to one virtual plane P passing through the central axis C of the cylindrical or columnar magnet 7I. An engagement mechanism 10I as the convex-concave engagement portion 10a formed as a plane (FIG. 15 illustrates only the shape of the magnet 7I) is configured to be symmetric with respect to the virtual plane P. In this case, the convex-concave engagement portion 10a serving as a stopper (a positioning portion) for rotation about the central axis C is provided to one position. Accordingly, it may be possible to attach the magnet 7I to the component (not illustrated) in a reversed posture. However, if the magnet 7I is attached in a reversed posture, the location of the magnetic poles does not change. Therefore, the magnet 7I is attached to the component in a predetermined posture to thereby achieve the desired location of the magnetic poles. FIG. 15 illustrates only the shape of the magnet 7I, and the positioning portion is designated by reference numerals 10a.

The foregoing embodiments are susceptible to considerable variation in the practice. For example, while the embodiments are described above as being applied to a television apparatus and a notebook PC having two display screens, the embodiments may be applied to other electronic devices having a display panel and a front panel in front thereof. Examples of such electronic devices include notebook or desktop PCs with a single display screen, personal digital assistants (PDAs), smartbooks, smartphones, and mobile phones.

The specifications (operation system, structure, form, material, size, length, width, number, arrangement, location, curvature radius, etc.) can be changed as required for the electronic device, the television apparatus, the PC, the component, the magnet, the magnetic pole, the magnetic sensor, the angle detection mechanism, the engagement mechanism, the convex-concave engagement portion, the display panel, the first body, the second body, the joint, the magnet unit, the holder, the housing, the outer wall, the outer circumference surface, the inner circumference surface, and the like. A bottomed hole may be provided inside the magnet in place of the through hole. Besides, input and output devices, a circuit board, and the like may be provided to the joint. The control circuit board may be provided to the second body. Further, the number of the magnetic poles, the size and location of each magnetic pole area, and the like can also be changed as required.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A television apparatus comprising:
   a first component and a second component connected to be relatively rotatable;
   a substantially cylindrical magnet provided to the first component, the magnet comprising a plurality of magnetic poles along an outer circumference;
   a magnetic sensor provided to the second component, the magnetic sensor configured to detect magnetism of the magnetic poles; and
   an engagement mechanism comprising at least one convex-concave engagement portion configured to mutually engage the magnet with the first component inside or along the outer circumference of the magnet, wherein the engagement mechanism is configured to be asymmetric with respect to a central axis of the magnet and asymmetric with respect to any virtual plane including the central axis, wherein:
   the engagement mechanism comprises the convex-concave engagement portion along the outer circumference of the magnet, and
   the convex-concave engagement portion is located opposite the magnetic sensor with respect to the central axis of the magnet.

2. A television apparatus comprising:
   a first component and a second component connected to be relatively rotatable;
   a substantially cylindrical magnet provided to the first component, the magnet comprising a plurality of magnetic poles along an outer circumference;
   a magnetic sensor provided to the second component, the magnetic sensor configured to detect magnetism of the magnetic poles; and
   an engagement mechanism comprising:

at least one convex-concave engagement portion configured to mutually engage the magnet with the first component inside or along the outer circumference of the magnet;
a first convex-concave engagement portion configured to mutually engage the magnet with the first component along the outer circumference of the magnet; and
a second convex-concave engagement portion configured to mutually fit-engage the magnet with the first component inside the magnet, and
wherein the engagement mechanism is configured to be asymmetric with respect to a central axis of the ma net and asymmetric with respect to an virtual plane including the central axis.

3. An electronic device comprising:
a first component and a second component connected to be relatively rotatable;
a substantially cylindrical magnet provided to the first component, the magnet comprising a plurality of magnetic poles along an outer circumference;
an engagement mechanism comprising a convex-concave engagement portion configured to mutually engage the magnet with the first component along the outer circumference of the magnet, wherein the engagement mechanism is configured to be asymmetric with respect to a central axis of the magnet and asymmetric with respect to any virtual plane including the central axis; and
a magnetic sensor provided to the second component so as to face a cylindrical outer circumferential surface of the magnet located separate from the convex-concave engagement portion in a relative rotation range of the first component and the second component, the magnetic sensor configured to detect magnetism of the magnetic poles.

4. The electronic device of claim 3, further comprising:
a first body comprising at least one of an input, an output, and a control circuit board;
a second body comprising at least one of an input, an output, and a control circuit board; and
a joint connected to both the first body and the second body to be relatively rotatable, wherein
the magnet is provided to the joint as the first component, and
the magnetic sensor is provided to at least one of the first body and the second body as the second component.

5. The electronic device of claim 3, wherein
the second component comprises a display panel, which is arranged on one side in a thickness direction of a housing of the second component, and
the magnetic sensor is located on another side in the thickness direction of the housing.

6. The electronic device of claim 3, wherein
the first component comprises an outer wall that bends about a rotation axis as a central axis of relative rotation of the first component and the second component, and
the magnet is arranged such that the outer circumference of the magnet is located near an inner circumferential surface of the outer wall.

7. The electronic device of claim 3, further comprising a shaft to attach the magnet, the shaft comprising a protrusion.

8. The electronic device of claim 7, wherein the protrusion is plastically deformed with attachment of the magnet.

9. The electronic device of claim 7, wherein the protrusion includes a plurality of protrusions that are aligned in order of height.

10. An electronic device comprising:
a first component provided with a magnetic sensor;
a substantially cylindrical magnetic element comprising a plurality of magnetic poles, the magnetic element further comprising a positioning mechanism comprising a positioning portion located on an outer circumference and configured to be asymmetric with respect to any virtual plane including a central axis;
a second component provided with the magnetic element and rotatably connected to the first component, wherein
the magnetic sensor is provided to face a cylindrical outer circumferential surface of the magnetic element located separate from the positioning portion located on the outer circumference in a rotation range of the first component and the second component.

11. The electronic device of claim 10, further comprising a shaft to attach the magnetic element, the shaft comprising a protrusion.

12. The electronic device of claim 11, wherein the protrusion is plastically deformed with attachment of the magnetic element.

13. The electronic device of claim 11, wherein the protrusion includes a plurality of protrusions that are aligned in order of height.

* * * * *